United States Patent [19]
Magi

[11] 3,802,766
[45] Apr. 9, 1974

[54] TRUCK MIRRORS

[75] Inventor: Hugo Magi, Etobicoke, Ontario, Canada

[73] Assignee: Dominion Auto Accessories Limited, Toronto, Ontario, Canada

[22] Filed: Oct. 31, 1972

[21] Appl. No.: 302,552

Related U.S. Application Data

[60] Division of Ser. No. 174,168, Aug. 23, 1971, which is a continuation of Ser. No. 876,735, Nov. 14, 1969, abandoned, which is a continuation-in-part of Ser. No. 698,875, Jan. 18, 1968, abandoned.

[52] U.S. Cl. .............................. 350/288, 350/307
[51] Int. Cl. ............................................. G02b 5/08
[58] Field of Search ................... 350/288, 293, 307; 240/4.2; 248/473, 479

[56] References Cited
UNITED STATES PATENTS

| | | | |
|---|---|---|---|
| 2,546,590 | 3/1951 | Ferrel | 16/128 |
| 3,214,578 | 10/1965 | Talbot | 240/4.2 |
| 3,265,878 | 8/1966 | Talbot | 240/4.2 |
| 3,408,136 | 10/1968 | Travis | 350/293 |
| 3,427,095 | 2/1969 | Dykema et al. | 350/288 |

*Primary Examiner*—Ronald L. Wibert
*Assistant Examiner*—Michael J. Tokar
*Attorney, Agent, or Firm*—Barnes, Kisselle, Raisch & Choate

[57] ABSTRACT

A side-mounted truck mirror in which a mirror having a gasket fitted around it is snapped into a suitable backing plate which has engagement members cooperating with the gasket to hold the mirror in place. The backing plate has a rearward recess in which a light source is mounted, and a light-transmitting member covering the recess and hinged to the backing plate in such a way that it can only be inserted and removed through movement axially of the hinge.

4 Claims, 5 Drawing Figures

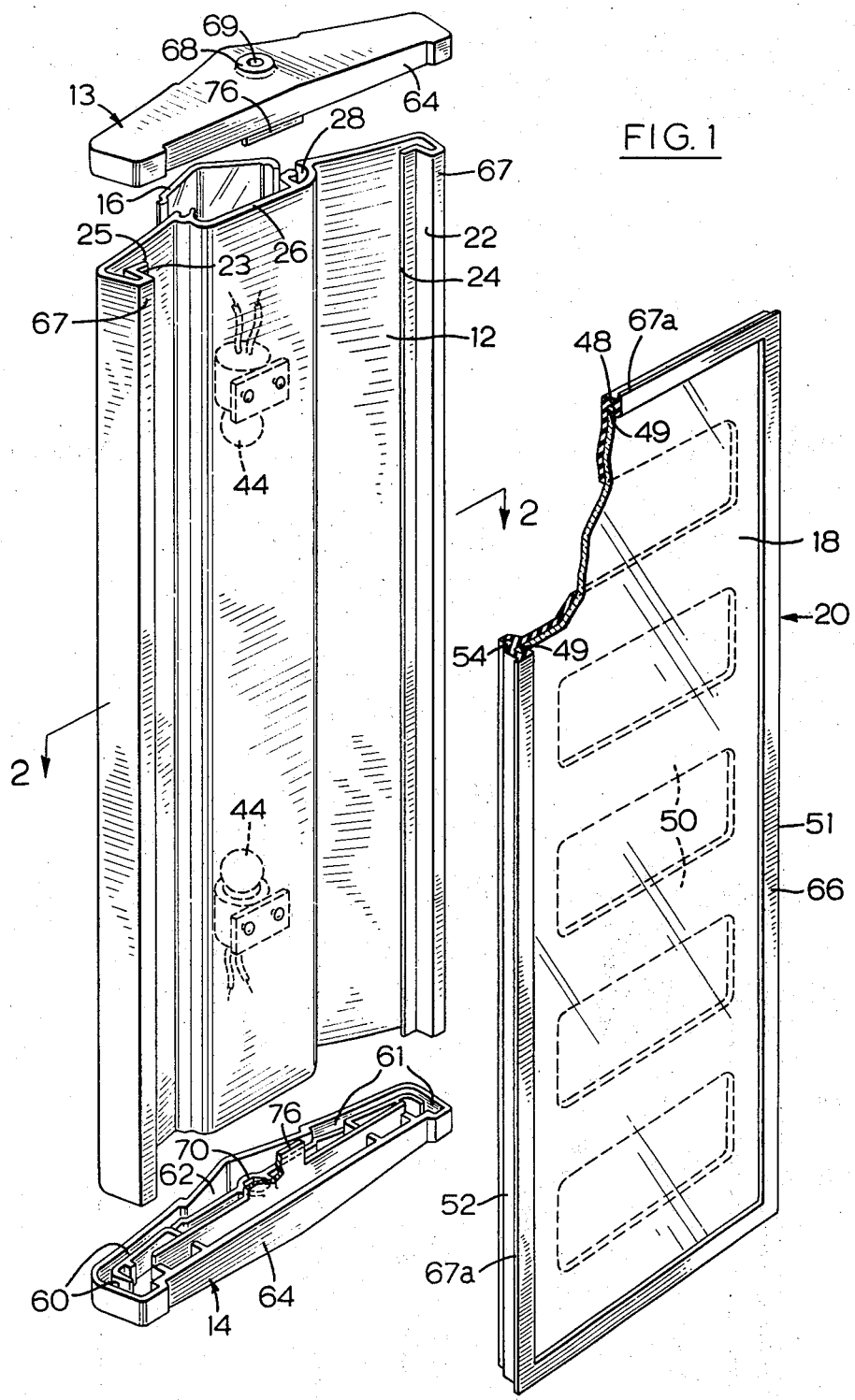

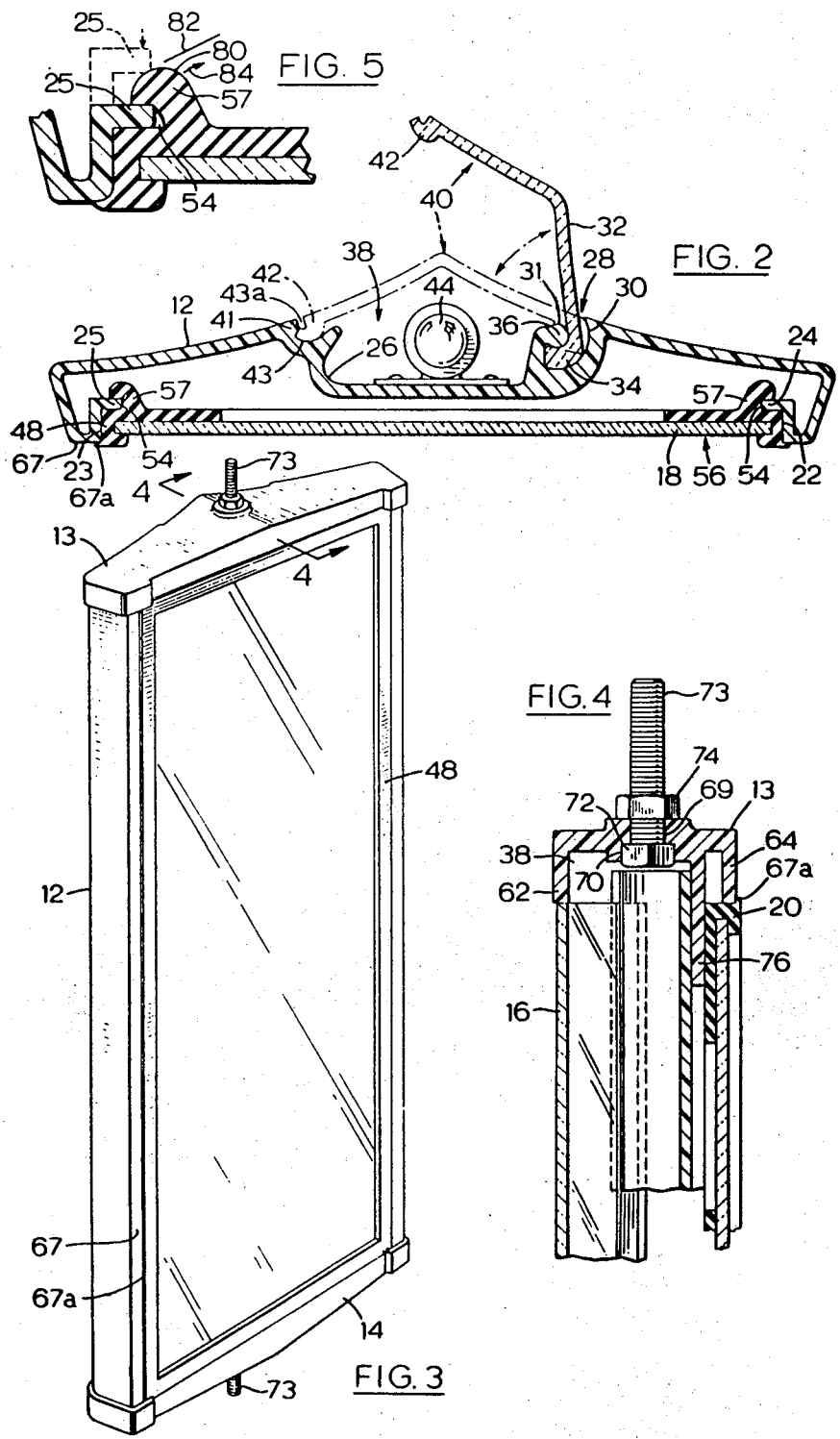

1

TRUCK MIRRORS

This is a division of application Ser. No. 174,168, filed Aug. 23, 1971 which, in turn, is a continuation of application Ser. No. 876,735, filed Nov. 14, 1969, now abandoned, which, in turn, was a continuation-in-part of application Ser. No. 698,875, filed Jan. 18, 1968, now abandoned.

This invention relates to truck mirrors of the kind usually referred to as "West Coast" mirrors, which are rear-view mirrors mounted on brackets extending from either side of the truck cab. With the aid of the side-mounted rear-view mirrors, the truck driver can, by looking to one side or the other, see rearwardly along either side of his truck.

One disadvantage of conventional side-mounted truck mirrors relates to the fact that the glass mirror itself can only be removed from or inserted into its supporting structure by first disassembling the supporting structure. Thus, whenever the glass mirror is cracked or broken, the supporting structure must be taken apart in order to remove the cracked mirror and insert a fresh one.

It is accordingly one object of this invention to provide a mirror assembly of which the supporting structure need not be disassembled in order to replace a broken or shattered glass mirror with an intact mirror.

It is desirable, and in some areas it is required by law, to construct rear-view mirrors of the above type in such a way that at least a portion of the back of the mirror assembly is illuminated and is visible over a 180° viewing arc, the boundaries of which are defined by the plane of the mirror surface. The provision of such a feature is a further object of this invention.

Accordingly, this invention provides a mirror assembly comprising: a mirror having two parallel edges, a forward face, and a rearward face, a gasket framing said mirror and having a V-shaped edge defining a continuous inwardly opening channel in which the edges of said mirror are received and gripped, the portions of the gasket receiving said parallel edges each having a rearwardly and outwardly extending ridge projecting from the rearward wall of said V-shaped edge and defining therewith two outwardly-opening slots adjacent said two parallel edges, and a backing plate having a front and a rear, and having two inwardly projecting parallel lips adapted to snap into place in said slots whereby the mirror is secured to the front of said backing plate, said backing plate having substantially the same dimension as the mirror in the direction of said parallel edges, the said rearwardly and outwardly extending ridges on the gasket each having an inwardly and rearwardly sloping cam surface adapted to contact the parallel lips as the mirror and the backing plate are being snapped together, such that the lips deform the ridges inwardly to permit the lips to enter said outwardly opening slots, and two end caps adapted for attachment to either end of said backing plate, the end caps abutting the mirror and restraining movement of the mirror with respect to the backing plate in the direction of said parallel edges.

One embodiment of this invention is shown in the accompanying drawings, in which like numerals denote like parts throughout the several views, and in which:

FIG. 1 is a partly broken-away, exploded, perspective view of the major components of the mirror assembly of this invention;

FIG. 2 is a sectional view taken at the line 2—2 in FIG. 1;

FIG. 3 is a perspective view of the mirror assembly in assembled condition;

FIG. 4 is an axial sectional view taken at the line 4—4 in FIG. 3; and

FIG. 5 is a partial sectional view, to a larger scale, of one portion of the assembly shown in FIG. 2.

Turning first to FIG. 1, the mirror assembly is seen to include a backing plate 12, an upper end cap 13, a lower end cap 14, a light-transmitting member 16, a reflective mirror 18, and a gasket 20.

The backing plate 12 is preferably a plastic extrusion of constant cross-section. The front of the backing plate 12 is visible in FIG. 1, and includes two parallel walls 22 and 23, from the inside edges of which inwardly extend two parallel lips 24 and 25. The backing plate 12 is further formed with a channel-shaped recess 26 approximately mid-way of the two parallel lips 24 and 25. Along one edge of the channel-shaped recess 26 is a hinge recess 28. Both the channel-shaped recess 26 and the hinge recess 28 open rearwardly of the backing plate 12. In FIG. 2, the hinge recess 28 is seen to be defined between two concentric cylindrical walls 30 and 31.

A light-transmitting member 32 is provided, having along one edge a curved hinge portion 34 which is shaped to fit snugly but slidably within the hinge recess 28 in such a way that the light-transmitting member 32 is pivotable about the axis 36 of the cylindrical walls 30 and 31 between a closed position, shown in broken lines, in which the light-transmitting member 32 defines a chamber 38 with the channel-shaped recess 26, and an open position, shown in solid lines, permitting access to the chamber 38. The hinge portion 34 is in part defined by curved walls of substantially the same curvature as the cylindrical walls 30 and 31. It will be appreciated that, with the snug fit provided by this arrangement, the light-transmitting member 32 cannot be removed from the hinge recess 28 except by sliding it upwardly or downwardly in the direction parallel with the axis 36 of the cylindrical walls 30 and 31. Thus, no mechanical attachment members are required to pivotally mount the light-transmitting member 32 on the backing plate 12. The light-transmitting member 32 is bent so that its apex 40 is the most rearward point on the mirror assembly when the light-transmitting member is in the closed position. The light-transmitting member 32 is maintained in its closed position by being snapped-in behind a lip 41 on the backing plate 12. The lip 41 is so constructed that marginal interference takes place between the lip 41 and the light-transmitting member 32 as the latter is pivoted toward its closed position. However, this invention provides that the light-transmitting member 32 be constructed of a somewhat resilient material, such as plastic, whereby reasonable inward pressure on the light-transmitting member 32 will cause it to snap in behind the lip 41, which then maintains the light-transmitting member in the closed position. The edge 42 of the light-transmitting member 32 is designed to rest against a curved recess 43 molded into the backing plate 12. When the light-transmitting member 32 is snapped in place, as shown in broken lines in FIG. 2, there remains between the edge 42 and the lip 41 a slot 43a into which a pointed tool, such as a screwdriver, can be inserted to pry the light-transmitting member 32 out of engagement behind the lip 41.

Light-producing means are provided in the chamber 38, preferably in the form of one or more light bulbs 44, and their customary sockets and wiring, all of which is conventional and need not be described here in detail.

Attention is again directed to FIG. 1, where the gasket 20 can be seen to frame the mirror 18. To permit the gasket 20 firmly to grip the mirror 18, the gasket 20 is provided with a channel-shaped edge 48, in which the edges 49 of the mirror 18 are received. The gasket 20 also has portions 50 bridging between the parallel edges 51 and 52, which extend in the long direction of the mirror 18 and the gasket 20.

The gasket 20 is also provided with means defining two slots 54 adjacent the parallel side edges 51 and 52 of the gasket 20. Preferably, each slot 54 opens in the direction away from the other slot, although it will become apparent hereinafter that the slots 54 could also open toward one another. It is also preferable that the slots be adjacent the face opposite the reflective face 56 of the mirror 18. In the preferred form of the invention shown, the slots 54 are defined by rearwardly and outwardly extending ridges 57 integral with the gasket 20. The slots 54 are so positioned that they can receive the lips 24 and 25 of the backing plate 12, thereby securing the mirror to the front of the backing plate 12.

Attention is now directed to the end caps 13 and 14 shown in FIG. 1. Except for the provision of an aperture in the lower end cap 14 for the entry of electrical wiring, the end caps 13 and 14 are identical. Looking at the lower end cap 14, it is formed as a single integral molding intended snugly to embrace the portions of the backing plate 12 extending from the lip 41 to the wall 23, and from the hinge recess 28 to the wall 22. These portions of the backing plate 12 have a snug fit with the inside walls 60 and 61 of the end cap 14. Intermediate the walls 60 and 61 at the rear of the end cap 14 is an inwardly stepped angled portion 62 which is identical in profile to the light-transmitting member 16, and is aligned with the light-transmitting member 16 when the latter is in its closed position, as shown in broken lines in FIG. 2. When the two end caps 13 and 14 are in position on the backing plate 12, the light-transmitting member 16 exactly fills the space between the walls 62 of the two end caps 13 and 14. This fit is intended to be sufficiently snug to prevent rainwater, etc., from entering the chamber 38.

Between the walls 60 and 61 on the front of each of the end caps 13 and 14 is an inwardly stepped flat wall 64. The front face 66 of the edge of the gasket 20 protrudes beyond the walls 64 and beyond the forward faces 67 of the backing plate 12, as is visible particularly in FIGS. 2 and 4. To improve the seal between the gasket 20 and the portions against which it fits, the front face 66 has a peripheral lip 67a, visible in all figures, which lies against the walls 64 and the faces 67. This measure helps to exclude rainwater, etc. from the interior of the mirror assembly.

Each end cap 13 and 14 has a central boss 68 surrounding a bore 69 which opens centrally into an interior, hexagonal recess 70 (visible on the lower end plate 14). As seen in FIG. 4, the hexagon 1 recess 70 is adapted snugly to receive the hexagonal head 72 of a threaded bolt 73 of which the shank passes through the bore 69. A nut 74 secures the bolt 73 to its particular end cap.

Adjacent the hexagonal recess 70, each end cap has an integral, upstanding tab 76 which is adapted to lie against the front face of the backing plate 12, opposite the chamber 38, as best seen in FIG. 4. The purpose of the tab 76 is to permit each end cap 13 and 14 to be rigidly secured to the backing plate 12, and this can be accomplished by, for example, electrosonic welding, riveting or bolting. This arrangement obviates the necessity for providing an end-threaded shaft running the entire length of the mirror assembly, and permits such a shaft to be replaced by the bolts 73, since the backing plate 12 provides a rigid backbone for the assembly.

Attention is now directed to FIG. 5, which shows one ridge 57 to a larger scale. In this figure, it will be observed that the ridge 57 has a roughly cylindrical rearward surface 80. During the snapping together of the mirror and the backing plate, the lip 25 shown in broken lines first contacts the ridge 57 at a location where the latter slopes at an angle indicated by the line 82. This rearward and inward slope is such that the lip 25, moving downwardly (in FIG. 5) with respect to the ridge 57, exerts an inwardly directed force against the ridge 57 and resiliently deforms the latter in the direction shown by the arrow 84. The ridge 57 thus moves inwardly to permit passage of the lip 25 into the slot 54, where the lip 25 is shown in solid lines in FIG. 5. It will be noted as well that the lip 25 also has a slight bevel on the forward inner corner, and although not essential, this provision is believed to improve the sliding of the lip 25 past the ridge 57 as the latter is resiliently deformed inwardly.

The method of assembly is as follows. The bulbs 44 and their associated sockets and wiring are first attached to the backing plate 12 within the recess 26. Then, the light-transmitting member 32 is slid axially into place with the hinge portion 34 fitting into the hinge recess 28 of the backing plate 12. Next, the bolts 73 are tightened into position in the bore 69 of the end caps 13 and 14, and the latter are fitted into position over the ends of the backing plate 12. The end caps 13 and 14 are then rigidly secured to the backing plate 12, for example by electrosonically welding the tabs 76 to the backing plate 12. The assembly is then ready to have the mirror and its associated gasket fitted into place. The construction of this invention permits the mirror 18 and its associated gasket 20 to be furnished as a unitary item which merely snaps into place between the lips 24 and 25 of the backing plate 12. The mirror 18 and its associated gasket 20 would then be purchased as a unit replacement item for the total mirror assembly. The final step, then, is to snap the mirror and its gasket into place against the backing plate 12. Once in place, the mirror 18 cannot fall out or be removed, unless it is shattered. If the mirror should become shattered, the individual pieces are removed, which permits removal of the gasket 20, following which a new mirror 18 with its own gasket 20 is inserted between the lips 24 and 25. It is thus seen that, with the construction of this invention, it is not necessary to disassemble the supporting structure for the mirror in order to replace a shattered mirror.

Where the gasket 20 is made of polyvinylchloride, it is possible to construct replacement mirror and gasket units by taking the gasket fresh from molding while it is still somewhat pliable, and fitting it around the mirror before it cures and shrinks. The mirror and gasket can then be packaged for shipment as a replacement unit.

It will be appreciated that the slots 54 need not necessarily be formed adjacent the side opposite the reflective face of the mirror 18. For example, the slots 54 could be situated in the same plane as the mirror 18 or possibly forwardly of the reflective face of the mirror 18. In the latter case, however, the lips 24 and 25 would have to be further separated to permit a snap-fit without mechanical interference between the lips and the portion of the gasket surrounding the edges of the mirror 18. Further, it is conceivable that the lip 25 could extend in the opposite direction to that shown, which would mean that the direction of the slots 54 would also have to be reversed.

The light-transmitting member 32 is preferably made of clear plastic and has longitudinal facets or "prisms" cut into one or both faces, in order to refract in all directions the light emitted by the bulbs 44. In this way, the apex 40 of the member 32 will be visible over a 180° arc, i.e., from any position rearward of the plane of the mirror 18. However, it would also be possible to make the member 32 of a material which was frosted or milky in appearance, whereby it would act as a "secondary source," emitting light in all directions.

In the appended claims the expression "reflective face of the mirror" designates the face nearest the viewer even, though it is appreciated that with normal glass mirrors, most of the actual reflection takes place at the opposite face, which has been silvered.

What I claim as my invention is:
1. A mirror assembly comprising:
a mirror having two parallel edges, a forward face, and a rearward face,
a gasket framing said mirror and having a V-shaped edge defining a continuous inwardly-opening channel in which the edges of said mirror are received and gripped, the portions of the gasket receiving said parallel edges each having a rearwardly and outwardly extending ridge projecting from the rearward wall of said V-shaped edge and defining therewith two outwardly opening slots adjacent said two parallel edges,
and a backing plate having a front and a rear, and having two inwardly projecting parallel lips adapted to snap into place in said slots whereby the mirror is secured to the front of said backing plate, said backing plate having substantially the same dimension as the mirror in the direction of said parallel edges, the said rearwardly and outwardly extending ridges on the gasket each having an inwardly and rearwardly sloping cam surface adapted to contact the parallel lips as the mirror and the backing plate are being snapped together, such that the lips deform the ridges inwardly to permit the lips to enter said outwardly opening slots,
and two end caps adapted for attachment to either end of said backing plate, the end caps abutting the mirror and restraining movement of the mirror with respect to the backing plate in the direction of said parallel edges, said backing plate having an elongated rearwardly opening, channel-shaped recess of uniform cross-section intermediate said two parallel lips, a hinge-recess along one edge of said channel-shaped recess, the hinge recess opening rearwardly of the backing plate and being defined between two concentric cylindrical walls, a light-transmitting member having along one edge a curved hinge portion adapted to fit snugly but slidably within said hinge recess such that the light-transmitting member is pivotable about the axis of said cylindrical walls between a closed position in which it defines a chamber with said channel-shaped recess and an open position permitting access to said chamber, and at least one light producing means mounted in said chamber, said light transmitting member being bent to define an apex constituting the most rearward point of the mirror assembly when the light-transmitting member is in said closed position.

2. A mirror assembly as claimed in claim 1, in which the channel-shaped edges of said gasket are snugly received between two parallel walls of the backing plate, said lips extending inwardly from said walls.

3. A mirror assembly as claimed in claim 2, in which said parallel edges are longer than the distance separating them, the gasket having portions bridging between said parallel edges adjacent the face opposite the reflective face of the mirror.

4. A mirror assembly as claimed in claim 1, in which said parallel lips each have an inwardly and rearwardly sloping cam surface substantially corresponding in shape to the cam surfaces on the respective ridges, thereby to facilitate the inward deformation of the ridges during the snapping together of the mirror and the backing plate.

* * * * *